(12) United States Patent
Ikebukuro

(10) Patent No.: US 10,172,337 B2
(45) Date of Patent: Jan. 8, 2019

(54) SPINNING REEL

(71) Applicant: Shimano Inc., Sakai, Osaka (JP)

(72) Inventor: Satoshi Ikebukuro, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/871,080

(22) Filed: Jan. 15, 2018

(65) Prior Publication Data
US 2018/0310541 A1 Nov. 1, 2018

(30) Foreign Application Priority Data

Apr. 26, 2017 (JP) ................................. 2017-086998

(51) Int. Cl.
A01K 89/01 (2006.01)
A01K 89/015 (2006.01)

(52) U.S. Cl.
CPC .. *A01K 89/01928* (2015.05); *A01K 89/01916* (2015.05)

(58) Field of Classification Search
CPC .............. A01K 89/01; A01K 89/01121; A01K 89/011221; A01K 89/011223
See application file for complete search history.

(56) References Cited

U.S. PATENT DOCUMENTS

| 6,176,446 | B1* | 1/2001 | Sato | A01K 89/01122 242/319 |
|---|---|---|---|---|
| 2002/0170997 | A1* | 11/2002 | Furomoto | A01K 89/029 242/246 |
| 2009/0152389 | A1* | 6/2009 | Ochiai | A01K 89/0108 242/231 |
| 2013/0206889 | A1* | 8/2013 | Ochiai | F16J 15/3204 242/322 |
| 2014/0191071 | A1* | 7/2014 | Hiraoka | A01K 89/01 242/311 |
| 2015/0264906 | A1* | 9/2015 | Miyamoto | A01K 89/006 242/321 |
| 2017/0332614 | A1* | 11/2017 | Saito | A01K 89/01902 |

FOREIGN PATENT DOCUMENTS

JP 2003-284465 A 10/2003

* cited by examiner

Primary Examiner — Emmanuel M Marcelo
(74) Attorney, Agent, or Firm — Global IP Counselors, LLP

(57) ABSTRACT

A spinning reel includes, a spool, a spool shaft, a pinion gear, a tubular-shaped collar, a tubular-shaped nut, and an elastic member. The spool is configured to have a fishing line wound thereon when accompanied by rotation of a rotor. The pinion gear is disposed around the spool shaft and on which the rotor is non-rotatably mounted. The tubular-shaped collar is rotatably disposed on the spool shaft on an end side of the pinion gear in the axial direction of the pinion gear, and supports the spool shaft. The tubular-shaped nut is disposed to accommodate the collar and configured to screw onto the pinion gear. The elastic member is disposed between an outer peripheral surface of the collar and an inner peripheral surface of the nut.

9 Claims, 3 Drawing Sheets

SPINNING REEL

CROSS-REFERENCE TO RELATED APPLICATIONS

This application claims priority to Japanese Patent Application No. 2017-086998, filed on Apr. 26, 2017. The entire disclosure of Japanese Patent Application No. 2017-086998 is hereby incorporated herein by reference.

BACKGROUND

Field of the Invention

The invention relates to a spinning reel.

Description of Related Art

In a spinning reel, a fishing line is wound around a spool along with the rotation of a rotor. Generally, the spinning reel comprises a spool shaft on which the spool is mounted, and a pinion gear on which the rotor is non-rotatably mounted. The spool shaft is disposed on a reel body and extends in the longitudinal direction through the inside of the pinion gear. The spool shaft reciprocates in the longitudinal direction of the reel body accompanying the rotation of a handle.

When the spool shaft reciprocates in the longitudinal direction of the reel body accompanying rotation of the handle, if the spool shaft and the pinion gear rub against each other, the rotational performance of the pinion gear is reduced. In order to suppress the reduction of the rotational performance of the pinion gear, for example, in Japanese Published Unexamined Application No. 2003-284465, a collar that supports the spool shaft is disposed on the tip side of the pinion gear. The collar supports the spool shaft so that there is a prescribed gap between the inner peripheral surface of the pinion gear and the outer peripheral surface of the spool shaft. Accordingly, the contact area of the spool shaft and the pinion gear decreases, and the increase in frictional force that is generated between the spool shaft and the pinion gear is suppressed.

The inner peripheral surface of collar that supports the spool shaft must be processed with high precision. In Japanese Published Unexamined Application No. 2003-284465, a nut or a pinion gear is abutted against this kind of collar, and the movement of the collar in the axial and radial directions is regulated.

However, with a configuration such as that in Japanese Published Unexamined Application No. 2003-284465, when the pinion gear rotates, the tip surface of the pinion gear and the collar rub against each other, and the rotational performance of the pinion gear may be reduced. Furthermore, in Japanese Published Unexamined Application No. 2003-284465, since radial movement of the nut with respect to the collar is prevented, bending of the spool shaft and/or a misalignment or tilting of the nut, etc. are prevented. Consequently, when the spool shaft is bent or members disposed around the shaft of the spool shaft are a misaligned or tilted, the frictional force generated between the members and the collar increases, and the rotational performance of the pinion gear may be reduced, or a problem can occur with the longitudinal movement of the spool shaft.

SUMMARY

The object of the present invention is, in a spinning reel, to suppress the reduction of the rotational performance of the pinion gear, and to move the spool shaft smoothly in the longitudinal direction.

The spinning reel according to one aspect of the present invention, in which a fishing line can be wound around a spool during the rotation of a rotor, comprises a spool shaft on which the spool is mounted, a pinion gear, a collar, a nut, and an elastic member. The pinion gear is disposed around the spool shaft, and a rotor is non-rotatably mounted thereon. The collar is tubular-shaped, rotatably disposed on the spool shaft on an end side in the axial direction of the pinion gear, and supports the spool shaft. The nut is tubular-shaped, disposed so as to accommodate the collar, and screws onto the pinion gear. The elastic member is disposed between the outer peripheral surface of the collar and the inner peripheral surface of the nut.

In this spinning reel, an elastic member is disposed between the collar that supports the spool shaft and the nut. Accordingly, the collar can be supported by the nut via the elastic member by forming a gap between the collar and the nut. Therefore, even when the inner peripheral surface of the collar is processed with high precision so that the spool shaft can be properly supported, because of the gap between the collar and the nut and the elastic deformation of the elastic member, it is possible to bend the spool shaft and/or misalign or tilt the nut, etc. disposed around the shaft of the spool shaft. Furthermore, the movement of the collar in the axial direction can also be regulated via the elastic member. Therefore, suppression of the frictional force that is generated between the collar and the pinion gear or the spool shaft is possible, and, as a result, it is possible to reduce suppression of the rotational performance of the pinion gear, and, moreover, smoothen the movement of the spool shaft.

Preferably, the spinning reel further comprises a stopper member disposed on the end side of the collar that retains the collar on the spool shaft. The collar comprises a small-diameter portion that can contact the end surface of the end side of the pinion gear, and a large-diameter portion that can contact the stopper portion and that is larger in diameter than the small-diameter portion. The elastic member is disposed between the outer peripheral surface of the small-diameter portion of the collar and the inner peripheral surface of the nut. In this embodiment, the collar and the elastic member are retained on the spool shaft using a simple configuration.

Preferably, the stopper member is a seal member that seals the gap between the spool shaft and the collar. In this embodiment, the stopper member can also be a seal member.

Preferably, the spinning reel further comprises a retainer disposed on the outer peripheral portion of the nut that stops the rotation of the nut. The nut comprises a head portion that accommodates the collar and a female threaded portion that screws onto the pinion gear. The retainer comprises an extension portion that extends to the radially inner side and that faces the head portion of the nut in the axial direction. The stopper member is mounted immovably in the axial direction between the extension portion of the retainer and the head portion of the nut. In this embodiment, the stopper member can be fixed between the retainer and the nut.

Preferably, the collar comprises a large-diameter portion that can contact the end of the pinion gear in the axial direction, and a small-diameter portion that is smaller in diameter than the outer diameter of the large-diameter portion. The nut comprises a stopper portion that is smaller in diameter than the outer diameter of the large-diameter portion of the collar, and a stepped portion that is larger in diameter than the outer diameter of the large-diameter portion of the collar. The stopper portion of the nut is disposed opposing the small-diameter portion of the collar. The stepped portion of the nut is disposed opposing the large-diameter portion of the collar. The elastic member is disposed between the large-diameter portion of the collar and the stepped portion of the nut. In this embodiment, the collar and the elastic member can be retained on the spool shaft using a simple configuration.

Preferably, the movement of the collar in the axial direction is regulated by the end surface of one end side of the pinion gear and the stopper portion of the nut. In this embodiment, the movement of the collar in the axial direction can be regulated using a simple configuration.

Preferably, the movement of the elastic member in the axial direction is regulated by the end surface of one end side of the pinion gear and the stopper portion of the nut. In this embodiment, the movement of the elastic member in the axial direction can be regulated using a simple configuration.

Preferably, the collar is made of an oil-impregnated sintered metal. In this embodiment, since the smoothness of the collar is improved, the frictional force that is generated between the collar and the members that contact the collar is suppressed.

Preferably, the elastic member is an O ring. In this embodiment, mounting of the elastic member is easier.

According to the present invention, in a spinning reel, a reduction of the rotational performance of the pinion gear can be suppressed, and the spool shaft can be moved smoothly in the longitudinal direction.

DETAILED DESCRIPTION OF THE EMBODIMENTS

First Embodiment

Figure 1:
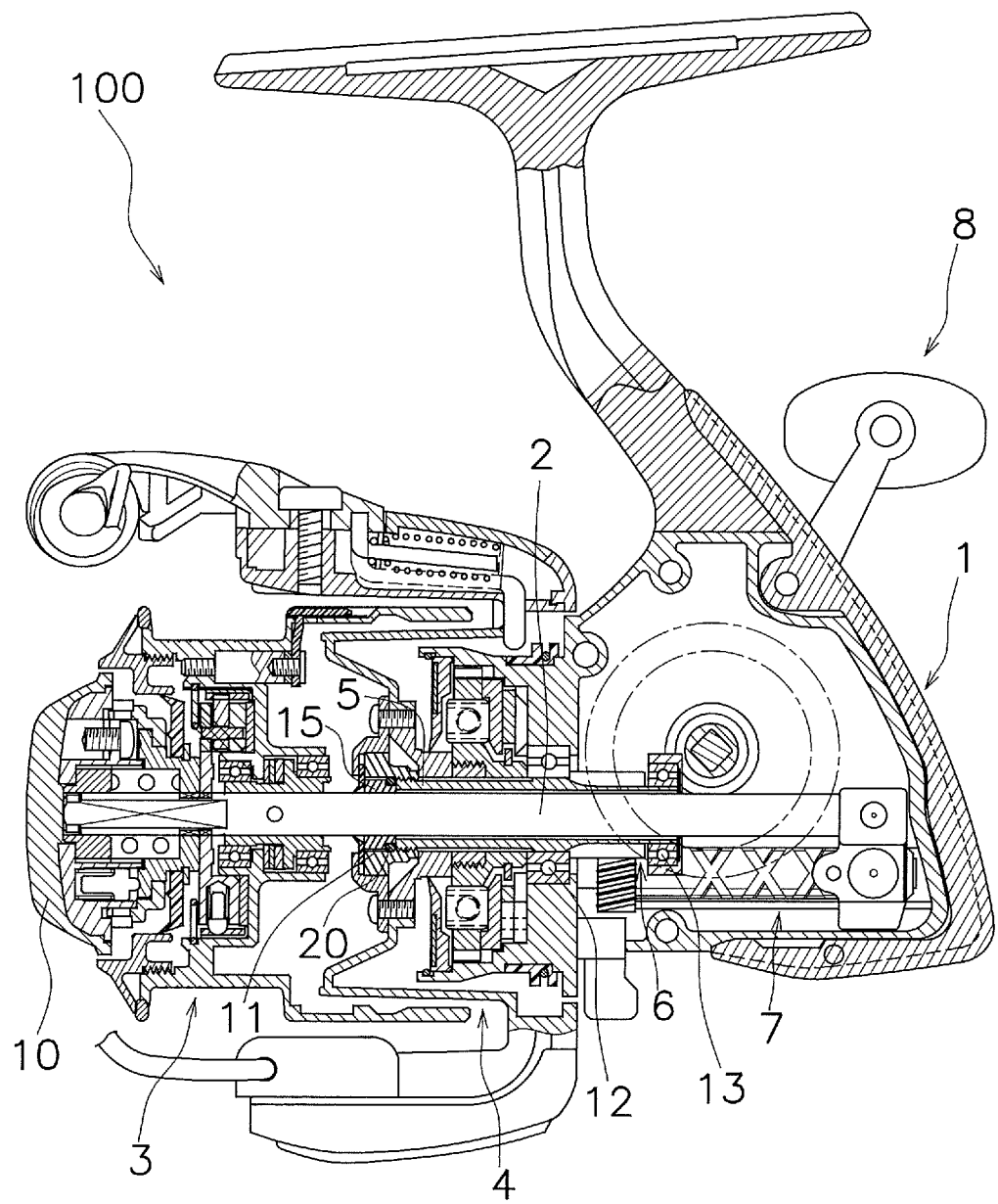
FIG. 1 is a longitudinal cross-sectional view of a spinning reel employing one embodiment of the present invention.

FIG. 1 is a longitudinal cross-sectional view of a spinning reel 100 employing one embodiment of the present invention. The spinning reel 100 comprises a reel body 1, a spool shaft 2, a spool 3, a rotor 4, and a pinion gear 5. Regarding forward and backward in the following description, when fishing, the direction that the fishing line is unreeled (cast) is forward and the opposite (reeled) direction is backward. Specifically, in FIG. 1 and FIG. 2, the left side in the axial direction is stipulated as forward (i.e., the casting direction), and the right side as backward (i.e., the reeling direction). Furthermore, left and right mean left and right when looking at the spinning reel 100 from the rear.

The reel body comprises an internal space, and a rotor drive mechanism 6 and an oscillating mechanism 7 that uniformly winds fishing line around the spool 3, etc. are accommodated in the internal space. A handle 8 is rotatably mounted on the right-side portion of the reel body 1.

The spool shaft 2 is disposed on the reel body 1, extending in the longitudinal direction. The spool shaft 2 extends through the inside of the pinion gear 5.

The spool 3 is a member around which the fishing line is wound. The spool 3 is fixed to the spool shaft 2 by a knob member 10 that screws onto the tip of the spool shaft 2. The spool shaft 3 reciprocates in the longitudinal direction of the reel body 1 together with the spool shaft 2 accompanying the rotation of the handle 8.

The rotor 4 is a member for winding the fishing line around the spool 3. The rotor 4 rotates around the center axis of the spool 3 accompanying the rotation of the handle 8.

The pinion gear 5 is disposed around the shaft of the spool shaft 2. The rotor 4 is non-rotatably mounted on the pinion gear 5. Specifically, as described below, the rotor 4 is non-rotatably mounted on the pinion gear 5 with a nut 11 that screws onto a male screw threads 5a (refer to FIG. 2) formed on the front end outer peripheral surface of the pinion gear 5. The pinion gear 5 is rotatably supported by the reel body 1 by an axle bearing 12 and an axle bearing 13.

On the front end side of the pinion gear 5, a tubular-shaped collar 15 that supports the spool shaft 2 is rotatably disposed on the spool shaft 2. The collar 15 is a member made of an oil-impregnated sintered metal; accordingly, the slidability of the collar 15 is increased, and the friction between the collar 15 and the spool shaft 2 is suppressed.

Figure 2:
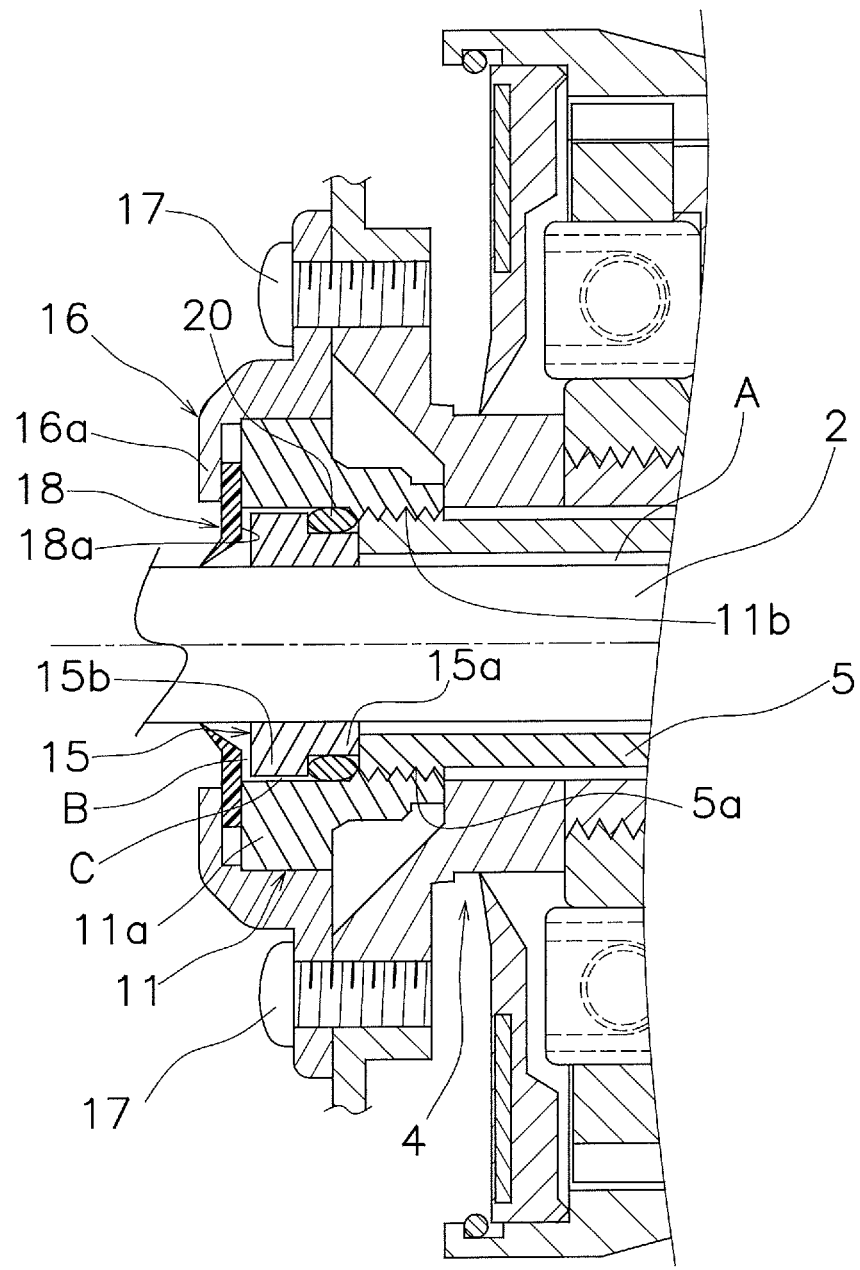
FIG. 2 is a partially enlarged view of FIG. 1.

The collar 15, as shown in FIG. 2, supports the spool shaft 2 so that there is a prescribed gap A between the inner peripheral surface of the pinion gear 5 and the outer peripheral surface of the spool shaft 2 in the axial direction. By forming the gap A and decreasing the contact area between the pinion gear 5 and the spool shaft, the friction between the pinion gear 5 and the spool shaft 2 can be suppressed.

The collar 15 comprises a small-diameter portion 15a and a large-diameter portion 15b. The small-diameter portion 15a is disposed so that the rear end surface can contact the front end surface of the pinion gear 5. The small-diameter portion 15a is formed so that the outer diameter is smaller than the outer diameter of the pinion gear 5.

The large-diameter portion 15b has a larger outer diameter than the outer diameter of the small-diameter portion 15a, and is formed to extend forward from the small-diameter portion 15a along the spool shaft 2. Meanwhile, the inner diameters of the large-diameter portion 15b and the small-diameter portion 15a are the same.

On the outer peripheral portion of the collar 15, a tubular-shaped nut 11 is disposed so as to accommodate the collar 15. The nut 11 comprises a head portion 11a and a female threaded portion 11b. The collar 15 is accommodated with the inner peripheral portion of the head portion 11a, and a female threaded portion 11b is formed on the rear portion of the inner peripheral surface of the nut 11. The female threaded portion 11b screws onto the male screw threads 5a formed on the front end outer peripheral surface of the pinion gear 5.

A retainer 16 disposed on the outer peripheral portion of the nut 11 can stop the rotation of the nut 11. The retainer 16 is fixed to the rotor 4 with a plurality of screw members 17. The retainer 16 comprises an extension portion 16a that extends toward the radially inner side. The extension portion 16a is formed in front of the retainer 16, and is disposed opposing the head portion 11a of the nut 11 in the axial direction.

In the axial direction, a seal (stopper) member 18 is disposed between the extension portion 16a of the retainer 16 and the head portion 11a of the nut 11. The seal member 18 is sandwiched between the extension portion 16a of the retainer 16 and the head portion 11a of the nut, and is immovable in the axial direction. The seal member 18 is a rubber lip seal in the present embodiment, contacts the spool shaft 2 in front of the collar 15, and seals the gap between the spool shaft 2 and the collar 15.

The seal member 18, in the rear, comprises a contact portion 18a that can contact the large-diameter portion 15b of the collar 15. The length in the axial direction from the contact portion 18a to the front end surface of the pinion gear 5 is longer than the length of the collar 15 in the axial direction, and there is a gap B disposed between the two. The collar is movable in the axial direction as about the width of the gap B, between the contact portion 18a and the front end surface of the pinion gear 5. In other words, the movement of the collar 15 in the axial direction is regulated by the seal member 18 and the pinion gear 5, and, accordingly, the collar is retained on the spool shaft 2.

Furthermore, although the collar 15 is movable in the axial direction between the contact portion 18a of the seal member 18 and the front end surface of the pinion gear 5, as described below, since the elastic member 20 is disposed on the small-diameter portion 15a of the collar 15, even if the elastic member 20 elastically deforms and the collar 15 and the pinion gear 5, or the collar 15 and the seal member 18, come into contact, the contact pressure between each other is low. Accordingly, the frictional force generated when the members come into contact can be suppressed to a minimum, and the reduction of the rotational performance of the pinion gear 5 can be suppressed.

The elastic member 20 is disposed between the outer peripheral surface of the small-diameter portion 15a of the collar 15 and the inner peripheral surface of the nut 11. The elastic member 20 is, for example, a rubber member that can elastically deform or an O ring in the present embodiment. The collar 15 is supported by the nut 11 via the elastic member 20, so that there is a prescribed gap C between the inner peripheral surface of the nut 11 and the outer peripheral surface of the large-diameter portion 15b of the collar 15. Meanwhile, the size of the gap C is configured to be about the same as gap A or smaller than gap A.

In the axial direction, the elastic member 20 is disposed between the large-diameter portion 15b of the nut 11 and the front end surface of the pinion gear 5. In other words, the movement of the elastic member 20 in the axial direction is regulated by the large-diameter portion 15b and the front end surface of the pinion gear 5, and, accordingly, the elastic member 20 is retained on the spool shaft 2.

By disposing the elastic member 20 in this manner, the collar 15 is movable in the radial direction with respect to the nut 11 accompanying the elastic deformation of the elastic member 20. Accordingly, bending of the spool shaft 2 and/or the misalignment or tilting of the collar 15, the nut 11, etc. disposed around the shaft of the spool shaft 2 is possible. Therefore, the increase in the frictional force generated between the collar 15 and the spool shaft 2 can be suppressed. As a result, the reduction of the rotational performance of the pinion gear 5 can be suppressed, and the spool shaft can be moved smoothly in the longitudinal direction.

Meanwhile, when the collar 15 attempts to move a significant distance in the radial direction, by the outer peripheral surface of the large-diameter portion 15b of the collar 15 contacting the inner peripheral surface of the nut 11, the movement of the collar 15 in the radial direction is regulated.

Second Embodiment

Figure 3:
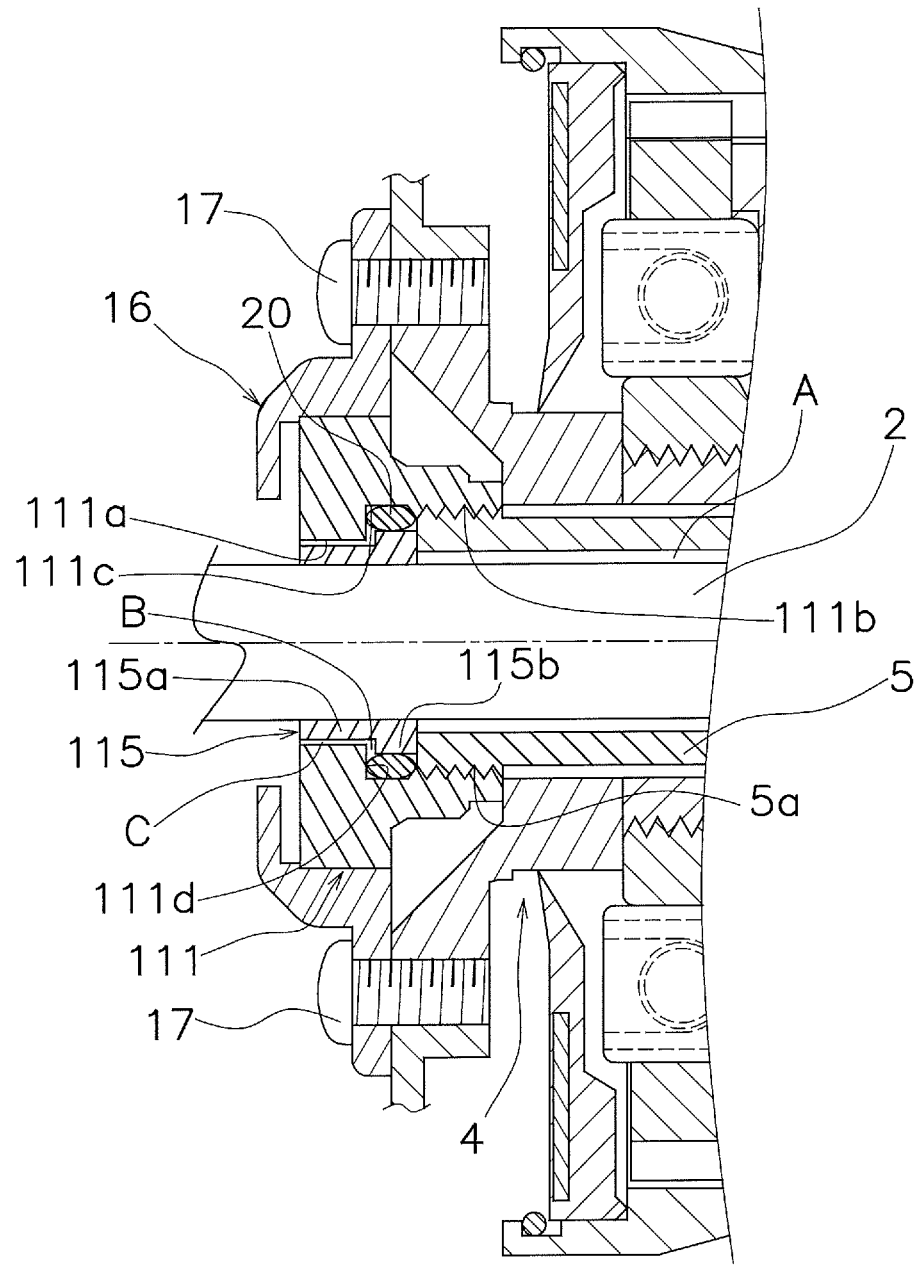
FIG. 3 is a diagram corresponding to FIG. 2 of another embodiment.

FIG. 3 shows a partially enlarged view of the peripheral surface of the collar according to the second embodiment of the present invention. In the second embodiment, the configurations of the nut 111 and the collar 115 are different from the first embodiment. Configurations that are different from the first embodiment will be described below in detail.

The collar 115, similarly to the first embodiment, supports the spool shaft 2 so that there is a prescribed gap A between the inner peripheral surface of the pinion gear 5 and the outer peripheral surface of the spool shaft 2 in the axial direction.

The collar 115 comprises a large-diameter portion 115b and a small-diameter portion 115a. The large-diameter portion 115b is disposed so that the rear end surface can contact the front end surface of the pinion gear 5. The large-diameter portion 115b is formed so that the outer diameter is smaller than the outer diameter of the pinion gear 5.

The small-diameter portion 115a has a larger outer diameter than the outer diameter of the large-diameter portion 115b, and is formed to extend forward from the large-diameter portion 115b along the spool shaft 2. Meanwhile, the inner diameters of the small-diameter portion 115a and the large-diameter portion 115b are the same.

On the outer peripheral portion of the collar 115, a tubular-shaped nut 111 is disposed so as to accommodate the collar 115. The nut 111 comprises a stopper portion 111a, a female threaded portion 111b, and a stepped portion 111c. The female threaded portion 111b has a similar configuration to the female threaded portion 11b in the first embodiment, and screws onto the male screw threads 5a of the pinion gear 5.

The stopper portion 111a is formed on the front inner peripheral surface of the nut 111. The stopper portion 111a is smaller in diameter than the outer diameter of the large-diameter portion 115b of the collar 115, and is disposed to face the small-diameter portion 115a of the collar 115. A prescribed gap C in the radial direction is disposed between the stopper portion 111a and the small-diameter portion 115a of the collar 115.

The stepped portion 111c is formed on the inner peripheral surface of the nut 111, between the stopper portion 111a and the female threaded portion 111b. The stepped portion 111c is larger in diameter than the outer diameter of the large-diameter portion 115b of the collar 115. The stepped portion 111c is disposed to face the large-diameter portion 115b of the collar 115. Furthermore, the length in the axial direction of the stepped portion 111c is longer than the length of the large-diameter portion 115b of the collar 115 in the axial direction, and there is a gap B disposed between the two.

By forming the nut 111 and the collar 115 as described above, the collar 115 can be retained on the spool shaft 2 using a simple configuration. Specifically, the nut stopper portion 111a comprises a step wall 111d formed by the difference in level with the stepped portion 111c. The large-diameter portion 115b of the collar 115 can contact the step wall 111d and the tip of the pinion gear 5. Thus, the collar 115 is disposed so as to be movable in the axial direction just as much as the gap B, between the step wall 111d and the tip of the pinion gear 5. In other words, the movement of the large-diameter portion 115b of the collar 115 in the axial direction is regulated by the step wall 111d and the tip of the pinion gear 5, and, accordingly, the collar 115 is retained on the spool shaft 2.

In the present embodiment, the elastic member 20 is disposed between the outer peripheral surface of the collar 115 and the inner peripheral surface of the nut 111. Specifically, the elastic member 20 is disposed between the outer peripheral surface of the large-diameter portion 115b of the collar 115 and the stepped portion 111c of the nut 111. Accordingly, the collar 115 is movable in the radial direction with respect to the nut 111 accompanying elastic deformation of the elastic member 20, and a similar effect as the above-described embodiment can be obtained.

Other Embodiments

Embodiments of the present invention are described above, but the present invention is not limited to the above-described embodiments, and various modifications can be made without departing from the scope of the invention.

In the above-described embodiment, the stopper portion 111a and the stepped portion 111c are disposed on the nut 111, and the large-diameter portion 115b and the small-diameter portion 115a are disposed on the collar 115, but the parts do not necessarily have to be included. An elastic member can be disposed between the inner peripheral surface of the nut 111 and the outer peripheral surface of the collar 115, without including the stopper portion 111a, the stepped portion 111c, the large-diameter portion 115b, and the small-diameter portion 115a.

What is claimed is:

1. A spinning reel, comprising:
   a spool configured to wind a fishing line thereon;
   a spool shaft configured to mount the spool;
   a pinion gear disposed around the spool shaft and configured to non-rotatably attach with the rotor;
   a collar rotatably disposed on the spool shaft on an end side of the pinion gear in an axial direction of the pinion gear, and supporting the spool shaft;
   a nut disposed to accommodate the collar and configured to screw onto the pinion gear; and
   an elastic member disposed between an outer peripheral surface of the collar and an inner peripheral surface of the nut.

2. The spinning reel recited in claim 1, further comprising a stopper member disposed on an end side of the collar and configured to retain the collar on the spool shaft,
   the collar comprising a small-diameter portion configured to contact the end side of the pinion gear, and a large-diameter portion configured to contact the stopper portion and that is larger in diameter than the small-diameter portion, and
   the elastic member being disposed between the outer peripheral surface of the collar at the small-diameter portion of collar and the inner peripheral surface of the nut.

3. The spinning reel recited in claim 2, wherein
   the stopper member is a seal member configured to seal a gap between the spool shaft and the collar.

4. The spinning reel recited in claim 2, further comprising a retainer disposed on an outer peripheral portion of the nut and configured to prevent the rotation of the nut,
   the nut comprising a head portion accommodating the collar and a screw portion configured to screw onto the pinion gear;
   the retainer comprising an extension portion extending radially inward to the head portion of the nut in the axial direction, and
   the stopper member being non-movably mounted in the axial direction between the extension portion of the retainer and the nut.

5. The spinning reel recited in claim 1, wherein
   the collar comprises a large-diameter portion configured to contact the end of the pinion gear in the axial direction, and a small-diameter portion that is smaller in diameter than the large-diameter portion,
   the nut comprises a stopper portion which is smaller in diameter than the large-diameter portion of the collar, and a stepped portion which is larger in diameter than the large-diameter portion of the collar,
   the stopper portion of the nut is disposed facing the small-diameter portion of the collar,
   the stepped portion of the nut is disposed facing the large-diameter portion of collar, and
   the elastic member is disposed between the large-diameter portion of the collar and the stepped portion of the nut.

6. The spinning reel recited in claim 5, wherein
   the end side of the pinion gear and the stopper portion of the nut are configured to prevent movement of the collar in the axial direction.

7. The spinning reel recited in claim 5, wherein
   the end side of the pinion gear and the stopper portion of the nut are configured to regulate movement of the elastic member in the axial direction.

8. The spinning reel recited in claim 1, wherein
   the collar is formed from an oil-impregnated sintered metal.

9. The spinning reel recited in claim 1, wherein
   the elastic member is an O ring.

* * * * *